March 5, 1974  E. L. SMITH ET AL  3,795,573
LINER
Filed Sept. 27, 1971
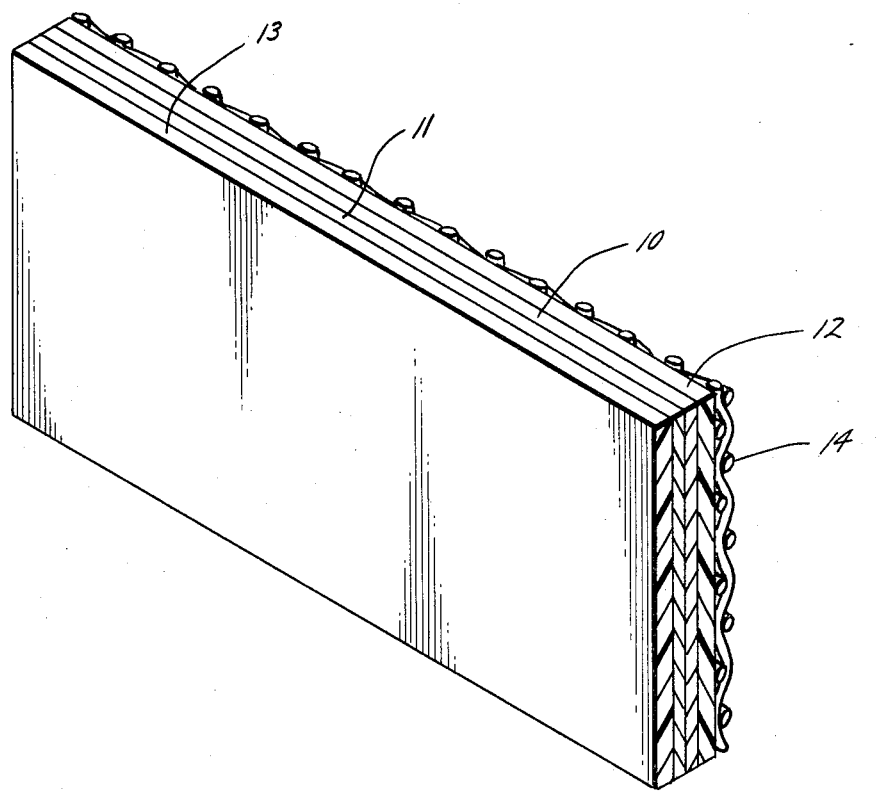
Ernest L. Smith
Arthur R. Duffy
Eugene S. Lyman
INVENTORS
BY J. Vincent Martin
Joe E. Edwards
S.M. Gay
ATTORNEYS United States Patent Office 3,795,573
Patented Mar. 5, 1974

3,795,573
LINER
Ernest L. Smith, P.O. Box 1612, Shreveport, La. 71102;
Arthur R. Duffy, 260 Hardy Way, Worthington, Ohio
43085; and Eugene S. Lyman, Rte. 1, Box 215, Northfield, Minn. 55057
Continuation-in-part of abandoned application Ser. No. 862,788, Oct. 1, 1969. This application Sept. 27, 1971, Ser. No. 184,263
B32b 5/24, 33/00
U.S. Cl. 161—165                            1 Claim

ABSTRACT OF THE DISCLOSURE

This invention relates to a laminate for use in lining a cryogenic tank comprising of multiple layers of woven polyester fibers such as woven polyethylene terephthalate fibers and stress-oriented polyethylene terephthalate films, and aluminum.

---

This application is a continuation-in-part of application Ser. No. 862,788, filed Oct. 1, 1969 for "Liner," and now abandoned.

This invention relates to liners for storage tanks and particularly to liners for use in cryogenic storage tanks of substantial size or volume.

In recent years the natural gas industry has turned to storage of liquified natural gas in many applications such as for peak shaving. See for instance, Pat. No. 3,196,622 to Smith, disclosing and illustrating a tank particularly adapted for the storage of liquified natural gas. The laminate of this invention may be used as an impermeable liner for a tank such as shown in the above-referenced Smith patent, and reference is made to that patent for a full disclosure of the manner in which such laminate will be supported between layers of protective insulation to provide a rugged and impermeable barrier to liquified natural gas and natural gas vapors which are held in equilibrium at cryogenic temperatures.

It is an object of this invention to provide an impermeable liner for cryogenic storage tanks, and particularly cryogenic storage tanks of substantial size or volume.

Another object is to provide an impermeable rugged liner for cryogenic storage tanks suitable for containing liquified natural gas and natural gas vapors which are held in equilibrium.

Another object of this invention is to provide an impermeable rugged liner for cryogenic storage tanks which, at cryogenic temperatures, is flexible, provides a gaseous impermeable barrier, has adequate strength to resist loads and stresses normally imposed on it during installation and while it is acting as an impermeable barrier, the liner remaining ductile at cryogenic temperatures.

In the drawing, the single figure illustrates a laminate fabricated in accordance with this invention.

The cryogenic tank for liquified natural gas or other liquids stored at cryogenic temperatures must have a liquid-vapor impermeable barrier. Normally, in a tank of the type disclosed in the above-referenced Smith patent, the barrier member will consist essentially of a liner member which is arranged to be free from exposure to structural loads. The liner must, however, be able to withstand exposure to certain secondary loads such as those which occur along and adjacent gaps formed in the insulation member when the insulation member undergoes temperature cycling, and also those gaps which are inadvertently formed due to improperly fitting insulation. The liner must also be able to withstand exposure to those accidental impact loads which frequently occur during construction of large storage tanks.

The primary gaseous and liquid impermeable barrier is provided by a sheet or film of aluminum. Preferably, a sheet or film of aluminum 10 is provided, this sheet being approximately 1 mil thick. Aluminum of this thickness with only a very few pin holes formed therein is commercially available. To provide a reliably impermeable barrier of aluminum, a second sheet of aluminum 11 is bonded to the sheet 10 so that the random location of pin holes between the two sheets will virtually eliminate the possibility of two randomly-located holes in different sheets becoming aligned, so as to permit penetration or leakage of vapors or liquids through the liner. In order to maintain the laminate as flexible as possible, the second sheet of aluminum 11 is approximately one-half mil in thickness. Even though there are more holes through the one-half mil sheet than the 1 mil sheet of aluminum, their random location when the two sheets are placed together reduces the probability of complete penetration of the aluminum barrier by alignment of holes through two separate sheets. As shown, these sheets are positioned side-by-side.

In order to provide strength for the liner, two layers or films, each approximately one-half mil thick, of stress-oriented polyethylene terephthalate are utilized. Stress-oriented polyethylene terephthalate is commercially available from E. I. du Pont de Nemours Corp. under the name "Mylar." Two approximately one-half mil thick layers 12 and 13 are selected, and they are bonded to opposite sides of the two aluminum sheets.

The primary purpose of the stress-oriented polyethylene terephthalate is to provide strength. Two sheets will provide substantially greater strength than a single sheet without sacrificing flexibility.

The stress-oriented polyethylene terephthalate also provides protection for the aluminum sheets against abrasion which could occur as a result of contact between the aluminum and the insulation material of the tank. In addition, the aluminum sheets are protected against damage which could occur during construction of the tank. Hence, this protective film is desirably positioned on both sides of the aluminum. The polyethylene terephthalate film also is more readily firmly bondable to the woven fibers of polyethylene terephthalate, such as, for example, Dacron sheet, such as the sheet 14, and thus a more rugged laminate structure can be obtained.

In order to provide additional strength, and particularly to provide tear resistance, the woven polyethylene terephthalate fibers in the form of a layer of approximately 0.8 ounce per square yard cloth is positioned adjacent to one of the layers of polyethylene terephthalate film, preferably on the surface remote from the aluminum layers. This woven polyethylene terephthalate increases the tear resistance of the laminate and also provides good abrasion resistance. It is, therefore, preferred that the woven polyethylene terephthalate fibers be placed in contact with the surface of the tank insulation when the laminate forming the liner is installed in the tank, such as the tank shown in the Smith patent, in the even relative motion occurs between the liner and the tank insulation during thermocycling. The layer formed of woven polyethylene terephthalate fibers provides substantial impact strength for the laminate. The several layers of aluminum, Dacron and Mylar may be joined together with any desired adhesive which will permit the resulting laminate to remain flexible. For example, a polyester base adhesive consisting of from 40 mol percent to 60 mol percent polyethylene terephthalate, balance polyethylene sebacate, disbursed in a suitable solvent such as trichloroethylene is preferably utilized as an adhesive for bonding the individual layers into a laminate. These adhesives are described in detail in U.S. Pat. 2,892,747.

The layers which form the laminate retain their ductility and remain relatively flexible at cryogenic temperatures such as those temperatures which occur during the storage of liquified natural gas and during the extraction or withdrawal of natural gas vapors from the liquified source held at equilibrium.

The laminate has a relatively low coefficient of thermal expansion, this coefficient being equal to or less than that of the insulation utilized in the above-identified Smith patent. Thus, contraction upon cooling from the ambient during construction will permit the liner to become free from the insulation layer. The liner is chemically inert to the presence of gaseous or liquid hydrocarbons and is also highly resistant to thermocycling and thermoshock at cryogenic temperatures. The liner has a relatively low modulus of elasticity so that reasonably large deflections may occur upon exposure to modest loads, however the laminate does not appear to suffer from fatigue. Furthermore, the liner does not appear to deteriorate with age, and accordingly has a long lifetime.

The foregoing disclosure and description of the invention is illustrative and explanatory thereof and various changes in the size, shape and materials, as well as in the details of the illustrated construction, may be made within the scope of the appended claim without departing from the spirit of the invention.

What is claimed is:
1. A liner for a cryogenic tank comprising,
two layers of aluminum positioned side-by-side to provide liquid-vapor impermeability,
one of said aluminum layers being approximately one mil thick and the other being one-half mil thick,
two layers of polyethylene terephthalate each approximately one-half mil thick,
said polyethylene terephthalate layers positioned on opposite sides of said two layers of aluminum,
a layer of approximately eight-tenths of an ounce woven polyethylene terephthalate cloth positioned adjacent one of said layers of polyethylene terephthalate on the side thereof remote from said aluminum layer,
And an adhesive between each of the adjacent layers binding said layers into a laminate.

References Cited

UNITED STATES PATENTS

| | | | |
|---|---|---|---|
| 3,669,816 | 6/1972 | Smith | 161—92 |
| 3,565,752 | 2/1971 | Grossman | 161—214 |
| 3,196,622 | 7/1965 | Smith et al. | 62—45 |
| 3,328,226 | 6/1967 | Wiley | 161—92 |
| 2,759,522 | 8/1956 | Limm | 161—213 |
| 3,640,832 | 2/1972 | Kurz | 161—214 |

FOREIGN PATENTS

| | | | |
|---|---|---|---|
| 245,801 | 11/1959 | Australia | 161—213 |
| 924,636 | 4/1963 | Great Britain | 161—213 |

OTHER REFERENCES

Dingwall, High-Yield Processing of Large-Scale Integrated Arrays, Integrated Circuits, p. 18–21, 1967, RCA TK2820 R25.

GEORGE F. LESMES, Primary Examiner

E. P. ROBINSON, Assistant Examiner

U.S. Cl. X.R.

161—89, 92, 214, 231, 404; 220—9 A, 9 LG, 9 M